United States Patent [19]

Jager et al.

[11] 3,717,494
[45] Feb. 20, 1973

[54] PROCESS FOR THE PRODUCTION OF COLOR BLACK BY THE FURNACE PROCESS

[75] Inventors: Gerhard Jager; Gerhard Kuhner, both of Grossauheim, Germany

[73] Assignee: Deutsche Gold - und Silber - Scheideanstalt vormals Roessler, Frankfurt (Main), Germany

[22] Filed: April 28, 1970

[21] Appl. No.: 32,712

[52] U.S. Cl. ................................................. 106/307
[51] Int. Cl. ............................................... C09c 1/50
[58] Field of Search ............ 106/307; 23/209.6, 209.8, 209.1, 23/209.2

[56] References Cited
UNITED STATES PATENTS

| | | | |
|---|---|---|---|
| 3,248,252 | 4/1966 | Schirmer et al. | 106/307 |
| 3,250,634 | 5/1966 | Kraus et al. | 106/307 |
| 3,523,812 | 8/1970 | Kraus | 106/307 |
| 3,279,935 | 10/1966 | Daniell et al. | 106/307 |
| 2,657,117 | 10/1953 | Sperberg | 23/209.6 |

*Primary Examiner*—James E. Poer
*Attorney*—Cushman, Darby & Cushman

[57] ABSTRACT

Color blacks of low pH are prepared from furnace blacks by treating the black before separation from the gas phase but after cooling at a temperature between 600° and 150°C., preferably between 500° and 250°C, with an aqueous solution of hydrogen peroxide. Preferably potassium is present in the feedstock in an amount sufficient that the finished carbon black has at least 150 ppm of potassium.

6 Claims, No Drawings

PROCESS FOR THE PRODUCTION OF COLOR BLACK BY THE FURNACE PROCESS

In preparing carbon black of industrial importance there was employed exclusively the so called channel process. According to this process fuel gas is burned in an insufficient supply of air and the flame quenched by a cooled metal plate. These channel blacks and carbon black produced by similar processes are characterized by a relatively low pH value of their aqueous suspensions which is due to the formation of acid groups on the surface of the carbon black particles. Additionally the content of volatile constituents of these carbon black is relatively high in most cases being substantially higher than 2 percent.

Because of these properties such a carbon black is suited not only for certain commercial rubber purposes but also especially for use as color black since the chemical groups on the carbon black surface cause a better distribution of the pigment in a suitable solvent which is of noteworthy influence on the blackness, tinting strength and viscosity of the color.

Meanwhile the channel process has become increasingly uneconomical due to industrial development and has been widely surpassed by the newer furnace process. According to the latter process an organic feed stock, for example fractions from coal tar distillation or aromatic concentrates of petroleum distillation is injected with addition of defined amounts of air into a closed furnace in which a hot flame is burning. By these exactly defined methods of operation there results the production of carbon black in substantially higher yields than can be obtained by the channel process. Besides the output for each unit of production is much higher with this type of furnace installation.

As a rule carbon black produced by the furnace process has a pH value which is mostly 8 or above.

In the meantime there have been successfully produced color blacks by the furnace process which can be used as substitutes for channel blacks. For this purpose a special after treatment of the furnace black formed is necessary, for example in a fluidized bed with oxidizing gases or gas mixtures or in a container with stirring equipment with an aqueous solution of an oxidation agent. Thus it is possible to reduce the pH value of a furnace black to 5 or below if an aqueous suspension of the black is treated with nitric acid or a mixture of hydrogen peroxide and sulfuric acid at slightly elevated temperature. The same effect can also be obtained if carbon in a fluidized bed reactor is exposed to the action of air which is enriched with oxygen or ozone, and in a given case additionally several percent of hydrogen peroxide vapor.

These oxidizing after treatments which mainly part are carried out at slightly elevated temperatures cause the formation of surface groups on the surface of the carbon black which are capable of having definite influence on the reactivity of the product. The presence of this type of groups can be detected in summary simply by the determination of the "volatile constitutents" or by the measurement of the pH value of an aqueous suspension of the carbon black.

All of the previously described after treatment processes properly speaking having the decisive disadvantage that the furnace black produced must undergo a treatment again in an additional, subsequent process. This is occasionally as expensive as the process of producing the base product. This is especially so for after treatment processes in aqueous suspension by which after oxidation the water must be removed and the carbon black dried.

The present invention avoids all the disadvantages of known processes by treating the carbon black with an aqueous solution of hydrogen peroxide before separation from the gas phase and after cooling. The aqueous hydrogen peroxide treatment is carried out at a temperature between 600° and 150°C., preferably between 500° and 250°C.

Preferably there is used a solution having a hydrogen peroxide concentration of about 35 weight percent, although this can vary from 10 weight % to 80 weight percent, and the necessary reduction in temperature is obtained by increasing the amount of quenching water.

In a given case it is appropriate to add additives to the carbon black feed stock so that the produced carbon black contains at least 150 ppm of potassium and preferably more than 700 ppm potassium. Thus there can be added potassium hydroxide or instead of potassium hydroxide there can be used potassium salts as for instance potassium halides such as KCl, KBr.

The hydrogen peroxide solution is brought to action on the carbon black most suitably in finely divided form, for example by spraying.

By the reduction of the temperature to the above named temperature range there is obtained an optimum temperature for an effective reaction of the hydrogen peroxide with the surface of the carbon black.

The color black produced by the process of the invention possesses excellent properties with regard to distribution in solvents so that blackness, tinting strength and viscosity of the color are especially favorable.

In the following examples it is shown how different amounts of additionally injected hydrogen peroxide have an effect on the carbon black and how the quenching temperature must be lowered in order to obtain a completely effective after treatment.

Unless otherwise indicated all parts and percentages are by weight.

EXAMPLE I

There were inserted in a carbon black oven of the usual type

| | |
|---|---|
| feedstock (Russol) | 25 kg./h. |
| fuel gas (city gas) | 12 Nm³/h. |
| atomizing air (5 atmospheres absolute) | 16 Nm³ |
| air for combustion (2,000 mm water column pressure) | 95 Nm³ |
| KOH | 250 mg. per kilogram carbon black forming oil |

The atomizing air serves to improve the dispersion of the carbon black forming oil while the fuel gas generally is provided to heat the carbon black furnace. The amount of quench water was so regulated that at the place of the addition of the hydrogen peroxide there was provided a temperature of 500°C. (quench temperature). There was no injection of hydrogen peroxide. The carbon black obtained had the following properties.

| Iodine surface area (cabot method) | 129 m²/g. |
| --- | --- |
| pH value of the aqueous suspension (according to the ASTM) | 9.0 |
| Volatile components | 1.20% |

EXAMPLE 2

The amounts of feedstock, fuel gas, atomizing air, air for combustion and potassium hydroxide additive were the same as in example 1. Simultaneously a quench temperature of 500°C. was again set. There was further added to the furnace 3.5 liter/h. of an aqueous 35 weight percent hydrogen peroxide solution by way of an injection nozzle. The carbon black produced had the following properties.

| Iodine surface area | 128 m²/g. |
| --- | --- |
| pH value of the aqueous suspension | 8.1 |
| volatile constituents | 1.59% |

Example 3

There was introduced in the carbon black furnace the same amounts of feedstock, fuel gas, atomizing air and KOH additive as in example 1. After a quench temperature of 500°C. was again adjusted there were added with the help of an supplemental quench 7 liters/h. of an aqueous 35 percent hydrogen peroxide solution. The carbon black had the following properties.

| Iodine surface area | 129 m²/g. |
| --- | --- |
| pH value of the aqueous suspension | 7.8 |
| volatile constituents | 2.69% |

EXAMPLE 4

There were introduced into the carbon black furnace the same amounts of feedstock, fuel gas, atomizing air, air of combustion and KOH additive as in example 1. Then the quench temperature was reduced to 400°C. by injection of more quench water. Again there followed the addition of 7 liters/h. of an aqueous, 35 percent hydrogen peroxide solution. The carbon black had the following properties.

| Iodine surface area | 127 m²/g. |
| --- | --- |
| pH value of the aqueous suspension | 7.2 |
| volatile constituents | 3.05% |

EXAMPLE 5

The same amounts of carbon black forming oil, fuel gas, atomizing air, air of combustion and KOH additive were introduced into the carbon black furnace as in example 1. By the addition of still more water the quench temperature was reduced to 300°C. At this temperature there were again added 7 liters/h. of an aqueous 35% hydrogen peroxide solution. The carbon black had the following properties.

| Iodine surface area | 129 m²/g. |
| --- | --- |
| pH value of the aqueous suspension | 6.7 |
| volatile constituents | 3.49% |

What is claimed is:

1. In a process for the production of carbon black in a gas phase in the form of color black by the furnace process and subsequently separating carbon black from the gas phase, the improvement consisting essentially of cooling the carbon black in the furnace to a temperature between 600° and 150°C and thereafter while still in the furnace at 600° to 150°C treating the carbon black with an aqueous solution of hydrogen peroxide before separation from the gas phase.

2. A process according to claim 1 wherein the carbon black containing gas is cooled to between 500° and 250°C. by the addition of quench water prior to the treatment with the aqueous hydrogen peroxide.

3. A process according to claim 1, wherein the hydrogen peroxide treatment occurs after cooling the carbon black containing gas to between 500° and 250°C.

4. A process according to claim 3 wherein there is employed an aqueous solution having a hydrogen peroxide concentration of about 35 weight %.

5. A process according to claim 1 wherein there is added to the carbon black forming raw material sufficient potassium containing material that the finished carbon black contains at least 150 ppm. of potassium.

6. A process according to claim 3 wherein the hydrogen peroxide solution is added in finely divided form to act on the carbon black.

* * * * *